UNITED STATES PATENT OFFICE.

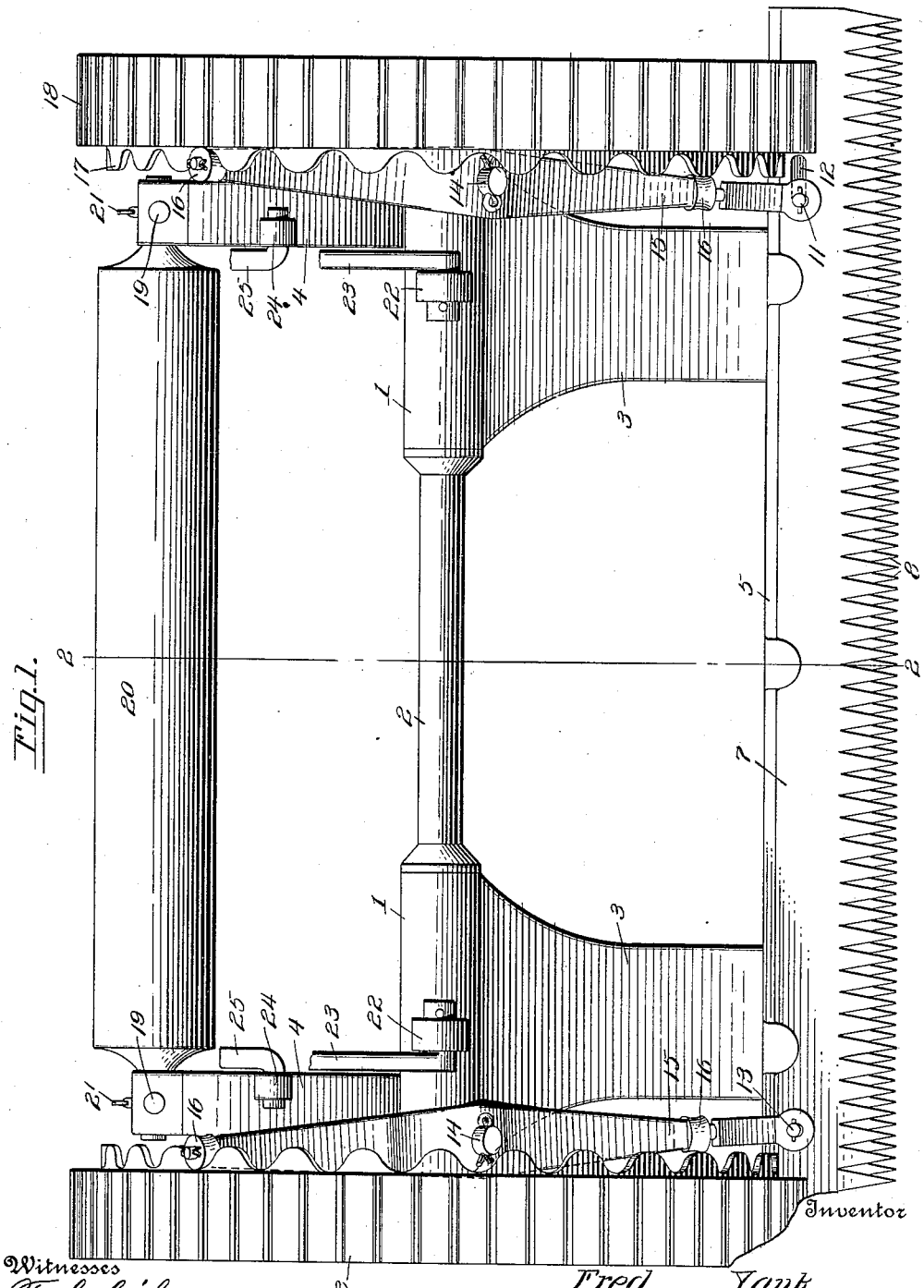

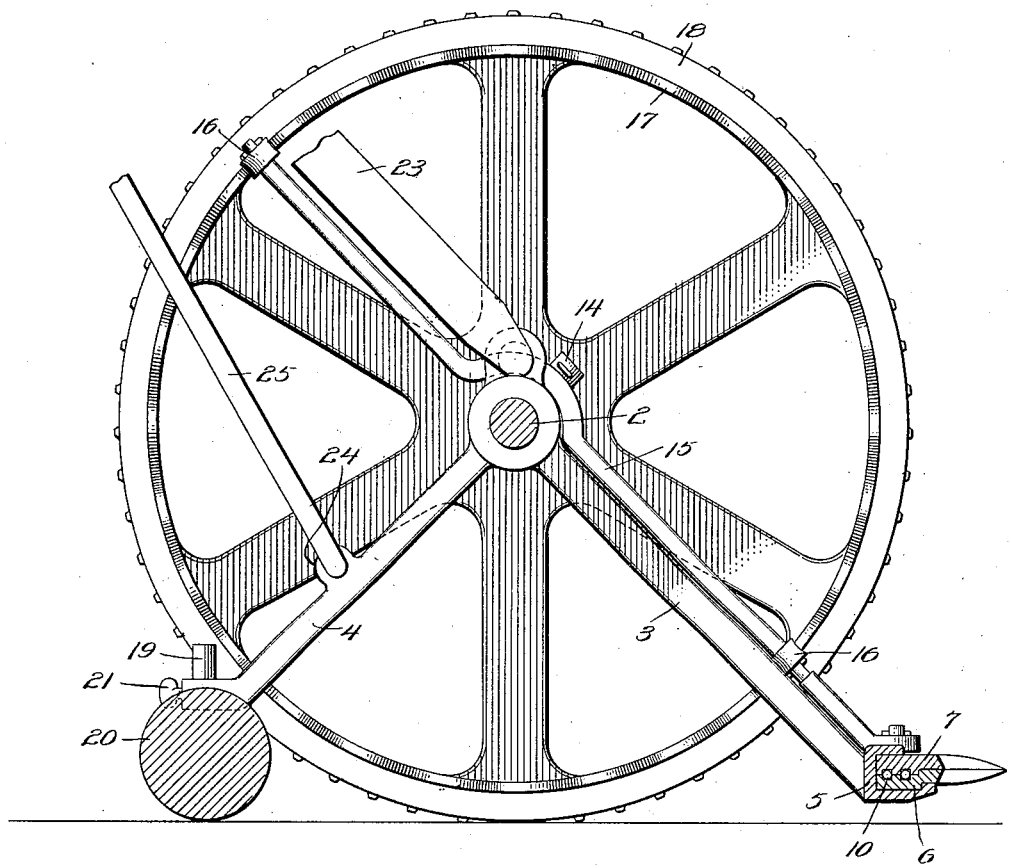

FRED YANK, OF SEATTLE, WASHINGTON.

LAWN-MOWER.

1,077,182.　　　　Specification of Letters Patent.　　Patented Oct. 28, 1913.

Application filed October 11, 1912. Serial No. 725,226.

*To all whom it may concern:*

Be it known that I, FRED YANK, a citizen of the United States, residing at Seattle, in the county of King and State of Washington, have invented new and useful Improvements in Lawn-Mowers, of which the following is a specification.

This invention relates to lawn mowers, and it has particular reference to a lawn mower provided with reciprocatory cutting apparatus.

The invention has for its prime object to produce a simple and effective frame to support the reciprocatory cutting apparatus and the ground wheels from which motion is transmitted to said cutting apparatus.

A further object of the invention is to simplify and improve the transmission mechanism whereby the members of the cutting apparatus are oppositely reciprocated.

With these and other ends in view which will readily appear as the nature of the invention is better understood, the same consists in the improved construction and novel arrangement of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a lawn mower constructed in accordance with the invention. Fig. 2 is a vertical sectional view taken on the line 2—2 in Fig. 1. Fig. 3 is a perspective detail view, showing one end of the bottom member of the cutting apparatus.

Corresponding parts in the several figures are denoted by like characters of reference.

The frame of the improved machine comprises inverted V-shaped side members provided at the apices thereof with bearings 1 for the main shaft 2. Each side member includes forwardly and rearwardly extending limbs designated, respectively, 3 and 4, and the forwardly extending limbs 3 are made relatively wide or broad so as to constitute brackets supporting the shoe or housing 5 wherein the members of the cutting apparatus are mounted. The cutting apparatus comprises the lower and upper members 6 and 7, each having forwardly extending triangular teeth 8, the opposed faces of which are perfectly flat and disposed in intimate contact with each other, that is to say, the upper faces of the teeth of the bottom member 6 contact with the lower faces of the teeth of the top member 7. The opposed faces of the members 6 and 7 are provided with grooves 9 for the reception of antifriction balls 10, whereby the operation is greatly facilitated. The bottom member 6 of the cutting apparatus is provided with a pin or stud 11 that extends upwardly through a slot 12 in the top member 7, near one end thereof. Said top member is provided near the opposite end thereof with an upwardly extending pin 13.

The boxes or bearing members 1 at the apices of the side members of the frame are provided with pins or studs 14 on which levers 15 are fulcrumed. Each of said levers carries two rollers 16 disposed equidistantly from the fulcrum, and said rollers are in engagement with diametrically opposite portions of a corrugated flange 17 formed on the side face of and extending laterally from the proximate ground wheel 18, the ground wheels being mounted on the axle, as shown, and the corrugated flanges being formed on the inner faces thereof. The corrugated flanges are, moreover, formed in such fashion that when one of the rollers 16 of each lever 15 engages a tooth or projection, the opposite roller of said lever will engage a space between two projections; thus, when the ground wheels are rotated, the levers 15 are rocked or vibrated. The arrangement, moreover, is of such a nature that the lower ends of the levers 15 will move simultaneously toward each other and likewise apart from each other, thereby causing the members 6 and 7 of the cutting apparatus to be moved in opposite directions so that the blades of grass entering between the teeth will be clipped or sheared, as will be readily understood. The rearwardly extending limbs 4 of the side members of the frame are provided with vertically adjustable supports 19 for the roller 20, said supports being held adjustably by means of set screws 21. Lugs or keepers 22 are formed on the bearing numbers 1 for the reception of the handle members 23, and lugs or eyes 24 are formed on the rear limbs 4 of the side members for engagement with handle braces 25.

From the foregoing description, taken in connection with the drawings hereto annexed, the operation and advantages of this invention will be readily understood.

The cutting apparatus may be made of any desired width so as to cut a wide swath in advance of the ground wheels, thereby avoiding the crushing of the grass by the latter previous to being cut.

The general construction of the device is very simple, and a light, durable and highly effective lawn mower may be produced at a moderate expense.

Having thus described the invention, what is claimed as new, is:—

1. In a lawn mower, a frame including side members having front and rear limbs, and bearing members at the convergence of said front and rear limbs, an axle supported in the bearing members, ground wheels on the axle, said ground wheels having laterally extending corrugated flanges on the inner faces thereof, levers fulcrumed on the bearing members and engaging diametrically opposite portions of the corrugated flanges, top and bottom cutting members supported for reciprocation on the front limbs of the frame members, the top member being provided with a slot, a pin extending from the bottom member through the slot of the top member and connected pivotally with one of the levers, a pin extending from the top member and connected pivotally with the other lever, said levers being so arranged and actuated that the top and bottom cutting members will operate in opposition and a housing on the front limbs of the frame members to inclose the cutting apparatus.

2. In a lawn mower, a frame including side members having front and rear limbs and provided with bearing members at the convergence of said limbs, a cutting apparatus including two reciprocatory members supported on the front limbs of the frame members, a roller supported adjustably on the rear limbs of the frame members, an axle supported in the bearing members, ground wheels mounted on the axle and provided with corrugated flanges on their inner faces, and levers fulcrumed on the bearing members, each lever being provided with rollers equidistant from the fulcrum thereof in engagement with the corrugated flange of the proximate ground wheel, said levers being connected with the respective members of the cutting apparatus to move said members in opposite directions.

In testimony whereof I affix my signature in presence of two witnesses.

FRED YANK.

Witnesses:
ELIAS A. WRIGHT,
RUTH LUNDGREN.

---

Copies of this patent may be obtained for five cents each, by addressing the "Commissioner of Patents, Washington, D. C."